May 18, 1954  C. BANKS ET AL  2,678,644
FOOD-WARMING STOVE OR APPARATUS
Filed Nov. 28, 1950  2 Sheets-Sheet 1

Inventors
Cyril Banks
Edward Banks Junior
By Michael S. Johnson

May 18, 1954     C. BANKS ET AL     2,678,644
FOOD-WARMING STOVE OR APPARATUS
Filed Nov. 28, 1950     2 Sheets-Sheet 2

INVENTORS:
CYRIL BANKS AND
EDWARD BANKS, JUNIOR
BY

UNITED STATES PATENT OFFICE 2,678,644

FOOD-WARMING STOVE OR APPARATUS

Cyril Banks and Edward Banks, Jr., Bradford, England

Application November 28, 1950, Serial No. 197,849

Claims priority, application Great Britain November 29, 1949

5 Claims. (Cl. 126—261)

The invention relates to devices or apparatus for keeping food warm of the kind comprising an inner container for the food, an outer container or casing, the walls of which are appropriately spaced from those of the inner container, and a support beneath the inner container to receive one or more holders for candles or blocks of wax adapted to be consumed by the burning of embedded wicks, provision being made for the admission of air to the lower part of the outer container or casing and for the outlet of heated air and combustion products from the upper end of the space between the inner and outer containers.

The invention has for its object to provide an improved construction of device of the kind referred to which will overcome certain difficulties hitherto experienced with such devices, and which will therefore prove more efficient in use.

Figure 1:
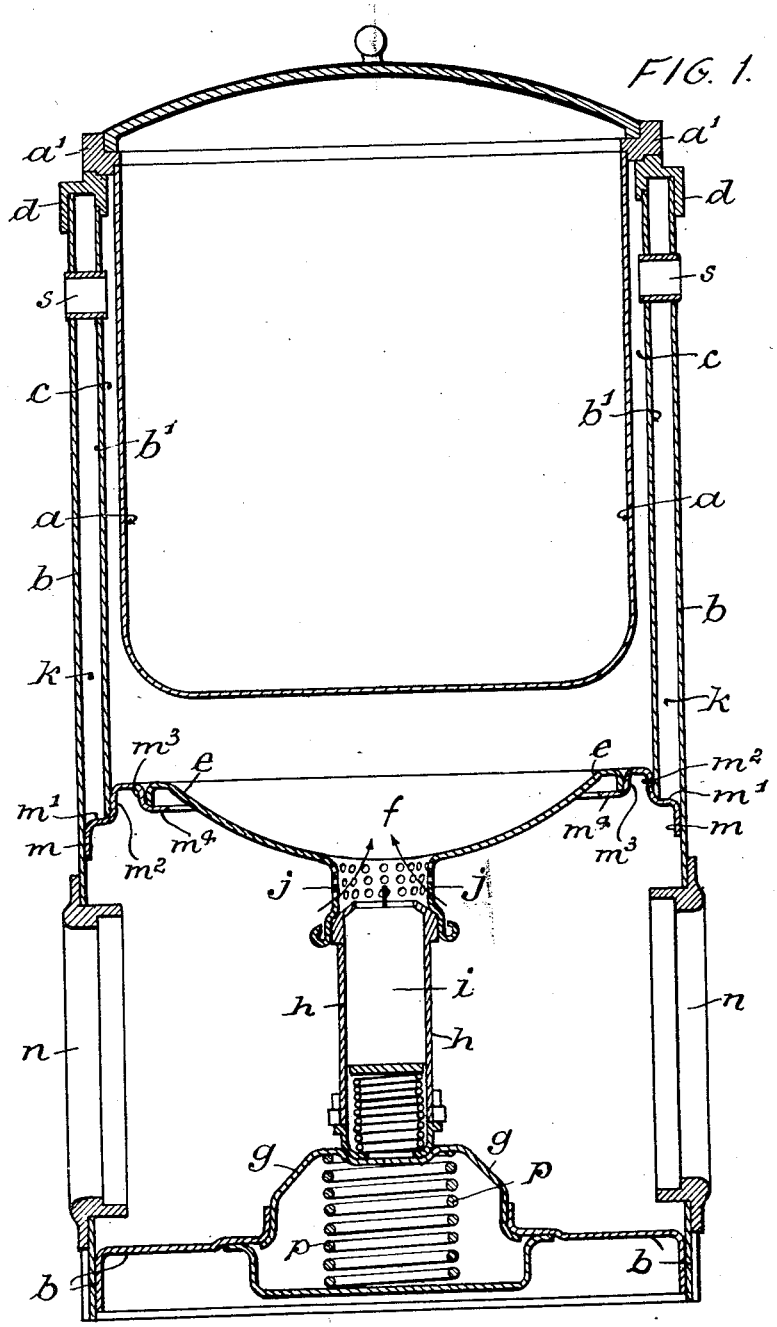
Figure 2:
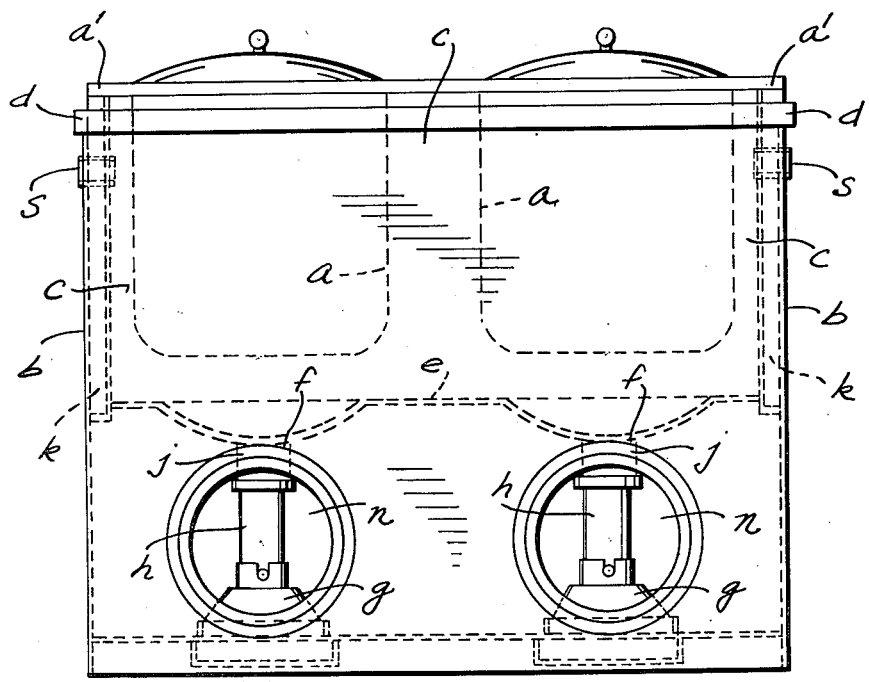

In the accompanying drawings, Fig. 1 shows in vertical section a heat-maintaining device embodying the invention and, according to the invention, arranged for the accommodation of a single food container; and Fig. 2 shows a modification to accommodate a plurality of food containers.

In the drawings, $a$ represents an inner container adapted to receive food to be kept warm, and $b$ an outer casing or container which surrounds and is suitably spaced from the inner container so as to provide an air space $c$ all around the inner container.

The inner container $a$ fits removably into an opening in the top of the outer container $b$ and is supported by means of an outward flange $a'$ resting on and centred by a ring member $d$ surrounding the upper end of the outer container.

Beneath and suitably spaced from the bottom of the inner container $a$ there is provided a horizontal division plate $e$ which forms a dished reflector and which shuts off the upper part of the outer casing $b$ from its lower part with the exception of an opening of suitable diameter disposed centrally beneath the inner container $a$.

Below the division plate $e$ there is provided a yielding support $g$ for a holder $h$ for a candle $i$ and the space between the top of the candle holder $h$ and the plate $e$ is closed in by a ring or tube $j$ of metal gauze or otherwise suitably perforated metal which fills the opening $f$.

The upper part of the outer container or casing $b$ is fashioned with a double wall the inner portion $b'$ of which is suitably spaced apart as shown from the outer portion to constitute a heat-insulating space $k$. This space $k$ is constituted by securing to the inner surface of the wall of the outer container the lower end of an inwardly-shouldered ring $m$, the width of the inward shoulder $m'$ of which is determined by the width or thickness of the insulating space $k$. At the inward termination of the shoulder $m'$ the ring $m$ is bent upwardly as at $m^2$ and then downwardly as at $m^3$ and inwardly as at $m^4$ to form an inwardly extending annular flange which supports the division plate $e$. This division plate is shown as being made in the form of a downwardly-dished and suitably curved reflector, the perforated ring or tube $j$ depending from which fills the space between the lower end of the reflector and the upper end of the candle holder $g$. The perforated tube $j$ need not, of course, be necessarily integral with plate $e$.

The lower end of the outer casing $b$ below the horizontal division plate or reflector $e$ is closed in with the exception of a suitable number of air admission openings $n$ the area of which may be adjustable.

The support $g$ on which the lower end of the candle holder $h$ rests is yieldingly pressed upwardly by a spring $p$. The candle holder can thus be pressed downwardly clear of the perforated tube $j$ and removed through an opening $n$ when renewal of the candle becomes necessary.

Tubular outlet members $s$ permit of escape of heated air and products of combustion from the space $c$ to the atmosphere.

If the device is to accommodate more than one food container $a$, as shown in Fig. 2, a top plate with the appropriate number of openings may be supported by the ring member $d$ and the division plate $e$ may have a corresponding number of openings to receive either flat plates or dished reflectors each accommodating beneath it a candle holder such as $h$.

If only a single food container $a$ is to be accommodated, as shown in Fig. 1, it and the outer casing $b$ may be circular in cross section. If more than one food container is to be accommodated, as shown in Fig. 2, the outer casing may be of flattened, oval or other suitable shape in cross section.

A device according to the invention enables either one or any larger number of food containers to be maintained at a determined heat without any risk of burning or of fire in the case of accident. The candle holders are quickly removable and replaceable when necessary, and appropriate selection of the aggregate area of the perforations in the ring or tubular member $j$, or the rings or tubular members as the case may be, enable the air supply for the burning of the candle or candles *i* to be correctly determined.

If desired, or not found necessary, the division plate *e* may not be dished downwardly to form a reflector, but may be flat.

It will be apparent that detail alterations may be made from the particular embodiment described and illustrated without departing from the general scope of the invention.

Having thus described our invention, what we claim as new and desire to secure by Letters Patent is:

1. A device for keeping food warm, comprising, in combination, an outer casing having an upper part open at the lower end thereof; an inner container arranged in said upper part of said casing and forming a first space with the wall of said upper part of said casing; an outlet connecting said first space with the atmosphere; a substantially horizontal division plate arranged across said lower end of said upper part of said casing at a distance from the lower wall of said inner container so as to form therewith a second space communicating with said first space, said division plate having a central aperture; a perforated tube arranged in the lower part of said casing and having one end thereof arranged in said aperture of said division plate; a candle holder; a yielding support for said holder, said support being arranged in the lower part of said casing below said perforated tube so as to hold the burning end of a candle supported by the holder in engagement with the lower end of said perforated tube so that the heat generated by the candle is conveyed upwards through said perforated tube into said second space; and the lateral wall of said lower part of said casing being formed with an opening, whereby air enters said casing through said opening and is conducted through the perforated walls of said tube to the burning end of the candle.

2. A device for keeping food warm, comprising, in combination, an outer casing having a double walled upper part open at the upper and lower ends thereof; a ring member arranged at the upper end of said upper part of said casing so as to form a junction of the double walls thereof; an inner container arranged in said upper part of said casing and being suspended from said ring member, said inner container forming a first space with the inner wall of said upper part of said casing; an outlet member passing through the double walls of said upper part of said casing and connecting said first space with the atmosphere; a substantially horizontal division plate arranged across said lower end of said upper part of said casing at a distance from the lower wall of said inner container so as to form therewith a second space communicating with said first space, said division plate having a central aperture; a perforated tube arranged in the lower part of said casing and having one end thereof arranged in said aperture of said division plate; a candle holder; a yielding support for said holder, said support being arranged in the lower part of said casing below said perforated tube so as to hold the burning end of a candle supported by the holder in engagement with the lower end of said perforated tube so that the heat generated by the candle is conveyed upwards through said perforated tube into said second space; and the lateral wall of said lower part of said casing being formed with an opening, whereby air enters said casing through said opening and is conducted through the perforated walls of said tube to the burning end of the candle.

3. A device for keeping food warm, comprising, in combination, an outer casing having a double walled upper part open at the upper and lower ends thereof; a ring member arranged at the upper end of said upper part of said casing so as to form a junction of the double walls thereof; an inner container arranged in said upper part of said casing and being suspended from said ring member, said inner container forming a first space with the inner wall of said upper part of said casing; an outlet member passing through the double walls of said upper part of said casing and connecting said first space with the atmosphere; a substantially horizontal division plate arranged across said lower end of said upper part of said casing at a distance from the lower wall of said inner container so as to form a second space therewith communicating with said first space, said division plate being shaped as a dished reflector and having a central aperture; a perforated tube arranged in the lower part of said casing and having one end thereof arranged in said aperture of said division plate; a candle holder; a yielding support for said holder, said support being arranged in the lower part of said casing below said perforated tube so as to hold the burning end of a candle supported by the holder in engagement with the lower end of said perforated tube so that the heat generated by the candle is conveyed upwards through said perforated tube into said second space; and in the lateral wall of said lower part of said casing being formed with an opening, whereby air enters said casing through said opening and is conducted through the perforated walls of said tube to the burning end of the candle.

4. A device for keeping food warm, comprising, in combination, an outer casing having a double walled upper part open at the upper and lower ends thereof; a ring member arranged at the upper end of said upper part of said casing so as to form a junction of the double walls thereof; a plate having a plurality of openings and being supported by said ring member; a plurality of inner containers arranged in said upper part of said casing and being suspended from said plate through the openings thereof, respectively, said inner containers forming a first space with the inner wall of said upper part of said casing; an outlet member passing through the double walls of said upper part of said casing and connecting said first space with the atmosphere; a substantially horizontal division plate arranged across said lower end of said upper part of said casing at a distance from the lower walls of said inner containers so as to form therewith a second space communicating with said first space, said division plate having a plurality of apertures arranged, respectively, below said inner containers; a plurality of perforated tubes arranged in the lower part of said casing and having one end thereof arranged, respectively, in said apertures of said division plate; a plurality of candle holders; a plurality of yielding supports for said holders, respectively, said supports being arranged, respectively, in the lower part of said casing below said perforated tubes so as to hold the burning ends of candles supported by the holders in engagement, respectively, with the lower ends of said perforated tubes so that the heat generated by the candles is conveyed upwards through said perforated tubes into said second space; and the lateral wall of said lower part of said casing being formed with an opening, whereby air enters said casing through said opening and is conducted through the perforated walls of said tubes to the burning ends of the candles.

5. A device for keeping food warm, comprising, in combination, an outer casing having a double walled upper part open at the upper and lower ends thereof; a ring member arranged at the upper end of said upper part of said casing so as to form a junction of the double walls thereof; a plate having a plurality of openings and being supported by said ring member; a plurality of inner containers arranged in said upper part of said casing and being suspended from said plate through the openings thereof, respectively, said inner containers forming a first space with the inner wall of said upper part of said casing; an outlet member passing through the double walls of said upper part of said casing and connecting said first space with the atmosphere; a substantially horizontal division plate arranged across said lower end of said upper part of said casing at a distance from the lower walls of said inner containers so as to form therewith a second space communicating with said first space, said division plate being shaped as a dished reflector and having a plurality of apertures arranged, respectively, below said inner containers; a plurality of perforated tubes arranged in the lower part of said casing and having one end thereof arranged, respectively, in said apertures of said division plate; a plurality of candle holders; a plurality of yielding supports for said holders, respectively, said supports being arranged, respectively, in the lower part of said casing below said perforated tubes so as to hold the burning ends of candles supported by the holders in engagement, respectively, with the lower ends of said perforated tubes so that the heat generated by the candles is conveyed upwards through said perforated tubes into said second space; and the lateral wall of said lower part of said casing being formed with an opening, whereby air enters said casing through said opening and is conducted through the perforated walls of said tubes to the burning ends of the candles.

References Cited in the file of this patent

UNITED STATES PATENTS

| Number | Name | Date |
|---|---|---|
| 639,550 | Froberg | Dec. 19, 1899 |
| 929,089 | Hellmig | July 27, 1909 |
| 1,354,044 | Kruger | Sept. 28, 1920 |
| 1,739,138 | Giragosian | Dec. 10, 1929 |
| 1,952,776 | Quinlan | Mar. 27, 1934 |
| 2,064,101 | Berry et al. | Dec. 15, 1936 |
| 2,202,320 | Sacerdote | May 28, 1940 |
| 2,371,410 | Rickenbacher | Mar. 13, 1945 |

FOREIGN PATENTS

| Number | Country | Date |
|---|---|---|
| 8,816 | Switzerland | July 30, 1894 |
| 597,763 | Great Britain | Feb. 3, 1948 |